United States Patent

[15] 3,641,548

Groce

[45] Feb. 8, 1972

[54] OVERCURRENT-FAULT INDICATOR APPARATUS FOR TRUNK LINES OF AN ELECTRICAL POWER DISTRIBUTION SYSTEM

[72] Inventor: Larry A. Groce, Route 2, Box 575, Arlington, Tex. 79110

[22] Filed: Feb. 17, 1969

[21] Appl. No.: 799,621

Related U.S. Application Data

[63] Continuation-in-part of Ser. No. 780,541, Dec. 2, 1968, abandoned.

[52] U.S. Cl. .......................340/253 A, 340/248 C, 340/255
[51] Int. Cl. .........................................................G08b 21/00
[58] Field of Search ..............340/255, 248 B, 248 C, 253 C, 340/253 A; 317/31, 33, 14 A, 14 B, 14 C, 14 J, 14 K

[56] References Cited

UNITED STATES PATENTS

| | | | |
|---|---|---|---|
| 1,214,129 | 1/1917 | Brown | 340/253 A |
| 3,001,100 | 9/1961 | Schuh et al. | 317/33 X |
| 3,229,274 | 1/1966 | Riley et al. | 340/248 X |
| 3,297,913 | 1/1967 | Schweitzer, Jr. | 317/14 X |
| 3,414,772 | 12/1968 | Sonnemann | 317/14 |

FOREIGN PATENTS OR APPLICATIONS

| 289,538 | 4/1928 | Great Britain | 340/255 |
|---|---|---|---|

*Primary Examiner*—John W. Caldwell
*Assistant Examiner*—Daniel Myer
*Attorney*—Giles C. Clegg, Jr., Jack A. Kanz and Richard E. Bee

[57] ABSTRACT

Disclosed is an overcurrent-fault indicator apparatus for locating a trunk line fault in a power distribution system. The apparatus includes a pair of input terminals adapted to be connected with the primary and secondary of a power distribution transformer, first and second switches which may be a zener diode and reed-type contact, respectively, coupled to the first input terminal through a full wave rectifier, indicating display means which is actuated by the closing of the first and second switch, and second switch closing means coupled to the other input terminal for closing said second switch, this closing means including time delay circuitry provided by a resistor and capacitor for temporarily delaying the opening and closing of the reed switch.

5 Claims, 3 Drawing Figures

| | UNIT 42 | | | UNIT 41 | | |
|---|---|---|---|---|---|---|
| | S1 | S2 | INDICATOR | S1 | S2 | INDICATOR |
| NORMAL | OPEN | CLOSED | OFF | OPEN | CLOSED | OFF |
| FAULT | CLOSED | CLOSED | ON | OPEN | CLOSED | OFF |
| BREAKER 13 CLOSES | OPEN | OPEN | ON | OPEN | OPEN | OFF |
| BREAKER 13 OPENS | OPEN | OPEN | ON | OPEN | OPEN | OFF |

*INVENTOR*
LARRY A. GROCE

*ATTORNEY*

OVERCURRENT-FAULT INDICATOR APPARATUS FOR TRUNK LINES OF AN ELECTRICAL POWER DISTRIBUTION SYSTEM

This application is a continuation-in-part of application Ser. No. 780,541, filed Dec. 2, 1968, now abandoned.

This invention pertains to power distribution systems, more particularly to fault-indicating apparatus for such systems and even more particularly to new and improved fault indicator apparatus specifically suited for underground power distribution systems.

In recent years considerable interest has been generated, particularly among utility companies, in underground power distribution systems for subdivisions, shopping centers, etc. In addition to being attractive in appearance, unsightly overhead lines being avoided, these systems are not as vulnerable to environmental changes, and are more accessible for maintenance since the distribution transformers are not mounted upon poles high above the ground.

Underground distribution systems suffer from one disadvantage, however, in that faults are not as easily detected as they would be when they occur on an overhead line. (By a "fault" is meant the grounding of a cable which may be caused by a break in the cable or the insulation, for example). As a consequence of this detection difficulty, prior art techniques have involved coupling some type of fault indicator to each of the subsurface distribution transformers, a visual inspection of these fault indicators by the service man determining the location of the cable failure. In general, however, the designs of these existing fault indicators have not been entirely satisfactory.

It is therefore a primary object of the invention to provide improved fault indicator apparatus for use in conjunction with power distribution systems;

It is another object of the invention to provide a new and improved fault indicator apparatus specifically useful for underground power distribution systems;

It is a still further object of the invention to provide a directional fault indicator apparatus of the type to be coupled to distribution transformers which are connected in parallel to a looped trunk line which is fed by power cables on either side of the loop, the fault indicator apparatus having signal or visual display means associated therewith so that a lineman may readily locate a fault condition on the loop.

In accordance with these and other objects, the present invention is directed to fault indicator apparatus having a pair of inputs. Coupled to one of the inputs are first and second switches and an indicating signal means, the indicating signal means being actuated when both switches are closed. The closing of the first switch is effected when the current at the one input exceeds a predetermined value. The closing of the second switch is effected by means coupling the second switch to the other input, this closing being in response to at least a minimum voltage appearing at the said other input. Time delay circuitry, including a resistor and capacitor network, are included within said second switch-closing means.

A preferred embodiment of the invention utilizes a zener diode as the first switch, and an electromagnetically actuated reed contact as the second switch. The indicating signal means is a visual indicator for displaying the location of the fault to an inspecting lineman. The two inputs of the apparatus are desirably respectively coupled to the primary cable and secondary of the distribution transformer of a power distribution network.

Additional features of the invention, as well as other objects and advantages thereof, are more particularly covered in the following description taken in conjunction with the accompanying drawings, wherein.

Figure 1:
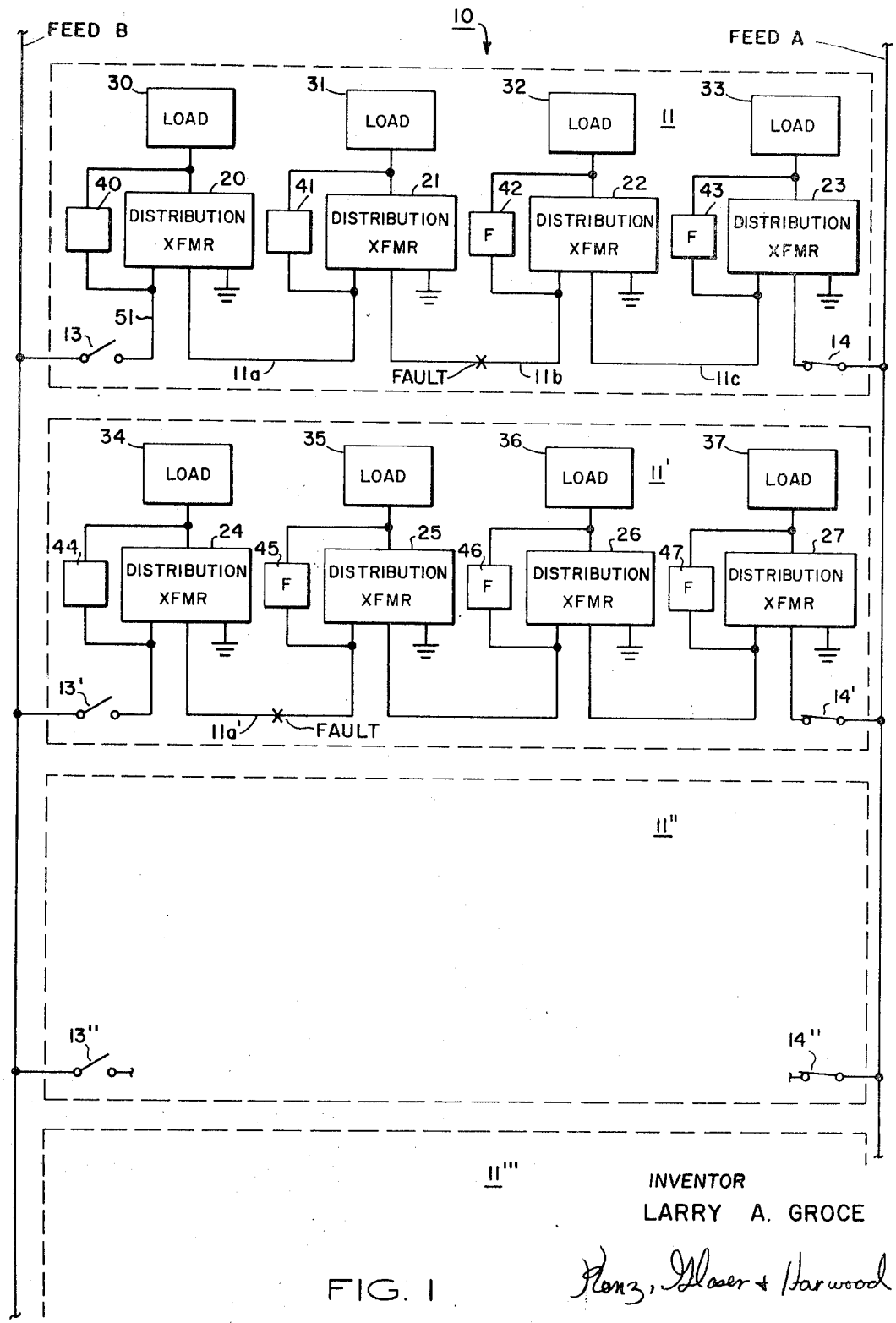
FIG. 1 illustrates, in block diagram, one type of power distribution system incorporating the fault indicator apparatus of the present invention.

Referring to the drawings, and more particularly to FIG. 1 thereof, the reference numeral 10 generally designates a power distribution system incorporating the improved fault-indicating apparatus of the present invention. It is to be pointed out that the description of a particular power distribution system is not to be considered restrictive, for the indicator apparatus of the invention may also be utilized with other systems.

Accordingly, a plurality of looped trunk lines 11, 11', 11'', 11''', etc., are connected to feeder cables A and B through circuit breakers 13 (13', 13'', etc.) and 14 (14', 14'', etc.), as illustrated, feeders A and B being coupled to a source of primary service voltage (not shown). Each of the loops has connected thereto a plurality of parallel-connected distribution transformers, the output or secondaries of these distribution transformers being respectively coupled to a load which may be, for example, the utility service entrance of a house. Specifically, loop 11 has connected therewith a plurality of distribution transformers 20–23 whose outputs are respectively coupled to the loads 30–33 Likewise, distribution transformers 24–27 couple loads 34–37 with the loop feed 11'. A similar interconnection scheme exists for the remaining loops 11'', 11''', etc. The following description is therefore referenced, in most instances, to only one of the loops 11, but is equally applicable to the other lines 11', 11'', 11''', etc.

Each of the portions of the loop interconnecting the distribution transformers (for example, portions 11a, 11b, and 11c) are desirably adapted for easy removal from the entire loop. For example, these portions may use conventional connectors at their ends to enable their plugging and unplugging from the lateral. A fault occuring at any of these portions may then be repaired after removing that portion from the line.

During normal operation, circuit breaker 13 is normally open, and circuit breaker 14 is normally closed, the power to the loop thereby being furnished from Feed A. Circuit breaker 13, however, is adapted or programmed to close when it senses a power loss, either due to a fault in the feeder cable A or in the loop 11.

In accordance with a specific feature of the invention, fault indicating apparatus, designated generally by reference numerals 40–47, is coupled to the high-voltage primary cable and the low-voltage secondary winding of the distribution transformers 20–27. These fault indicating apparatus are so designed to accurately and immediately communicate the location of a "fault" within the loop 11 so that this fault may be repaired in the shortest possible time.

Considering distribution loop 11, for example, assume that a fault occurs in the portion 11b between distribution transformers 21 and 22. As a consequence of this fault, a surge of current initially flows through the portion of the line 11 feeding transformers 22 and 23, tripping fault indicators 42 and 43 (now showing "F"), and opening normally closed circuit breaker 14. Fault indicators 40 and 41 remain untripped. Shortly thereafter, normally open circuit breaker 13 temporarily closes in response to the loss of power in the loop 11, the fault current then flowing through this circuit breaker causing it to reopen. Both of the circuit breakers 13 and 14 are now open and will not again automatically close into the fault.

Since only fault indicators 42 and 43 have thus been tripped, whereas fault indicators 40 and 41 have remained untripped, a visual inspection by the lineman of all of the fault indicators immediately indicates the location of the fault within the cable portion 11b. The faulted section 11b may then be removed or unplugged from the distribution system, both the vacuum circuit breakers 13 and 14 thereafter being closed to restore service to the loads 30 and 31, and loads 32 and 33, respectively. The faulted section 11b may then be repaired, replaced, and normally open circuit breaker 13 reopened to return the loop to its normal operation.

In similar manner, the occurrence of a fault in the portion 11a' desirably results in only fault-indicating apparatus 45, 46, and 47 being actuated, fault-indicating apparatus 44 remaining untripped. Visual observation of the fault indicators immediately indicates the location of the fault at the line portion 11a'.

In accordance with the previous description, each of the fault indicator apparatus 40–47 is so designed to be actuated only when the current in a portion of the loop exceeds a minimum value (represented by the fault current). In addition, during the period that normally open circuit breaker 13 temporarily closes into the fault, the fault indicators between breaker 13 and the fault (units 40 and 41 for example) remain untripped, thus preventing false indications of faults at other locations along the loop.

Figures 2, 3:
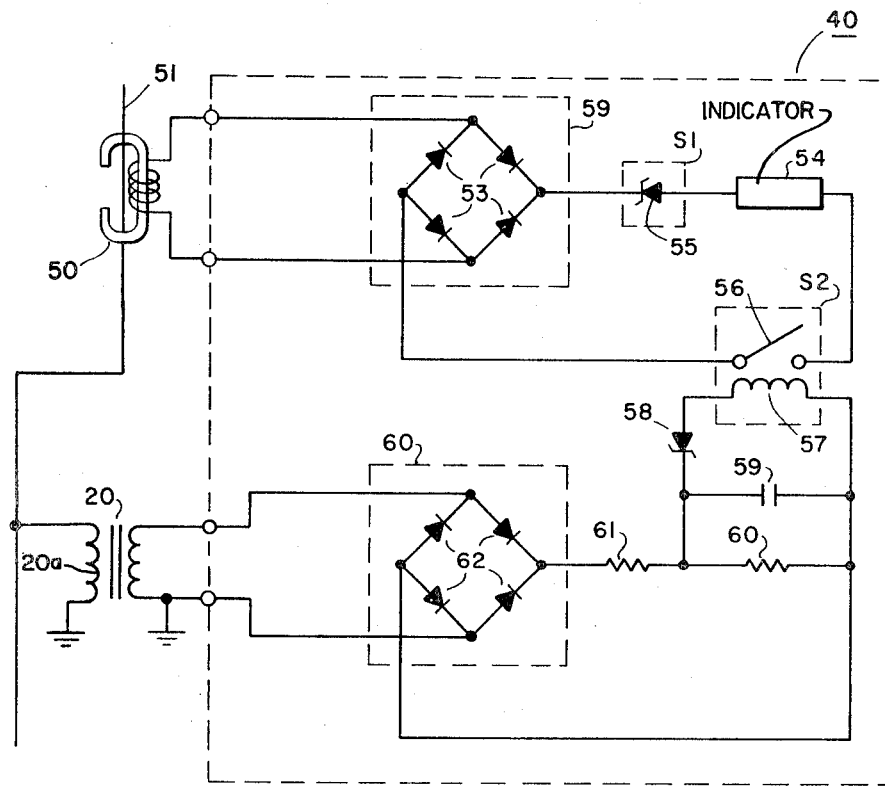
FIG. 2 is a schematic diagram of the fault indicator apparatus.
FIG. 3 is a chart summarizing the operation of fault indicator apparatus on each side of a fault as a consequence of this fault.

Referring now to FIG. 2, there is schematically illustrated the design of the fault indicator apparatus of the invention. Since each of the units 40–47 is identical, the following description is referenced to the unit 40, and is equally applicable to the remaining units. Accordingly, current transformer 50 couples the fault indicator apparatus 40 to the primary cable 51 to which is connected the primary winding 20a of the distribution transformer 20. A second input to the unit 40 is provided by direct coupling to the secondary of the transformer 20, for example.

The output of the current transformer 50 is thereafter coupled to a full wave rectifier 59 formed by interconnected diodes 53, as illustrated. Full wave rectifier 60 formed by interconnected diodes 62 provides the necessary rectification of the input signal from the transformer 20 secondary.

Coupled to the outputs of the rectifier 59 through switches $S_1$ and $S_2$ is indicating means 54 which is actuated when current is flowing there-through. The means 54 may be a visual indicator as a light bulb, for example, or may be an audio indicator, as a buzzer, which produces the appropriate signal when energized. In accordance with one preferred embodiment, however, the means 54 is a solenoid, which plunger is attached to a "flag," the plunger (and flag) actuated or raised by the requisite current flowing through the solenoid coil.

Referring again to FIG. 1, it is observed that, to accurately locate the fault in 11b, apparatus 42 (and 43) should be actuated while apparatus 41 (and 40) should remain untripped. As a consequence, the opening and closing of switches $S_1$ and $S_2$ are so controlled to complete the current loop through indicator 54 of the unit 42 when the fault occurs; while the current loop through indicator 54 of the unit 41 always remains open, even during the period the circuit breaker 13 is temporarily closed into the fault.

In accordance with a preferred embodiment of the fault indicator apparatus accomplishing such control, switch $S_1$ is a zener diode 55 having its cathode connected to the positive output of the full wave rectifier 59. The zener diode 55 does not conduct until an excessive current representing the fault current flows through the transformer 50 and induces a voltage at the diode input at least equal to the breakdown voltage of the diode.

A magnetically responsive reed type switch comprising the reed contact 56 and reed coil 57 provides the switch $S_2$. The switch is of the normally open type and is closed in response to the presence of an electromagnetic field resulting from current flow through the coil 57. Serially connected with the coil 57 is another zener diode 58; a capacitor 59 and resistor 60 connected in parallel with one another and across the series arrangement of the coil 57 and diode 58, as illustrated. A large value resistor connects the positive output of the rectifier 60 with the negative side of the diode 58.

The operation of the indicator apparatus illustrated in FIG. 2 is now described with reference to the previously outlined chain of events occurring in the distribution network of FIG. 1. To illustrate the advantageous action of the present invention, the following description specifically relates to the unit 42 actuated by the fault occurring in 11b, and the unit 41 which remains untripped.

Accordingly, during normal operation feeder A supplies the ordinary level of current through closed circuit breaker 14 to all of the distribution transformers 20–23. During this period, since the current level is below that required to trigger the zener diode 55, switch $S_1$ of both the units 41 and 42 are "open." In addition, since the normal power is being furnished to the loads, the output voltage from the secondary of the distribution transformer 20 is great enough to trigger the zener diode 58, thus resulting in the closing of switch $S_2$ of both units 41 and 42.

When the fault then occurs in the line portion 11b, the resulting excessive current through the primary of transformer 22 triggers the zener diode 55 of the unit 42, thus "closing" the switch $S_1$. Capacitor 59, which has charged during the normal operation cycle, maintains the requisite voltage across the series connected coil 57 and diode 58 to keep reed contact 56 (switch $S_2$) closed, even though the secondary voltage from the distribution transformer has been lost upon the opening of circuit breaker 14. Thus, the fault indicator display 54 of the unit 42 is turned "on." Fault indicator display 54 of unit 41 remains "off" since no fault current has flowed through its associated transformer.

When breaker 13 temporarily closes into the fault, the fault current surges through the cable 51 (and consequently the output of the current transformer 50). By this time, however, the capacitor 59 has discharged through the reed coil 57 and resistor 60 to lower the voltage at the cathode of the diode 58 below its breakdown voltage, thus opening the switch $S_2$ (reed contact 56) and preventing the closing of switch $S_1$ (conduction of zener diode 55). During the period the breaker 13 is closed, the characteristics of the capacitor 59 and resistor 61 are such that the capacitor 59 is prevented from charging to a high enough voltage to thereafter trigger zener diode 58 and close switch $S_2$.

Thus, the fault indicator display 54 of the unit 41 remains "off" during the entire cycle from occurrence of the fault until both circuit breakers 13 and 14 are finally opened. Fault indicator display 54 of the unit 41, once "on," remains "on" until manually or automatically reset to its "off" position. A summary of the above-described operation is detailed in the table of FIG. 3.

The values of the circuit components of the apparatus of FIG. 2 should be chosen to accomplish the operation previously described. For example, resistor 60 should be chosen so that the capacitor 59 will discharge below the voltage breakdown value of the diode 58 by the time the circuit breaker 13 closes into the fault. Resistor 61, on the other hand, should be large enough to prevent capacitor 59 from recharging to the breakdown value of the diode 58 while the circuit breaker 13 remains closed.

The invention, as previously described, contemplates the use of two switches $S_1$ and $S_2$ which, when both "closed," actuates fault indicator display 54. While two specific types of switches have been disclosed, a zener diode 55 and reed contact 56, other types of switches may be equally acceptable. In addition, it may be desirable to eliminate switch $S_1$ as a separate structure and incorporate it with the indicator display 54. For example, when indicator 54 is a solenoid and plunger arrangement, as previously described, it may be desirable to so choose the solenoid coil to prevent actuation of the plunger and "flag" until at least a minimum current (corresponding to a minimum "fault" current of the output of the transformer 50) flows through the solenoid coil. In this regard, switch $S_1$ is actually an integral portion of the indicator 54 itself.

Various modifications may be made to the above-described embodiments by one ordinarily skilled in the art without departing from the spirit and scope of the invention as defined by the appended claims.

What is claimed is:

1. In a power distribution system of the type having a pair of primary service voltage feeder cables coupled to a plurality of trunk lines through respective circuit breaking means, wherein each of said trunk lines has a plurality of parallel-connected distribution transformers connected therewith, and wherein each of said transformers has fault indicating apparatus connected thereto, the improvement wherein said fault indicating apparatus comprises:
  a. first input means coupled to the primary cable of said distribution transformer,
  b. second input means coupled to the secondary winding of said distribution transformer,
  c. first and second switches coupled to said first input means,
  d. indicating means for producing a signal only when said first and second switches are both closed,
  e. said first switch only closing in response to excessive current flowing through said primary cable of said distribution transformer, and
  f. means coupling said second input means with said second switch for closing said second switch in response to a voltage produced at said secondary, said means including time delay means for temporarily delaying said closing of said second switch.

2. Fault indicator apparatus, comprising:
  a. a first and second input terminal,
  b. a current transformer connected with said first input terminal,
  c. a full wave rectifier connected to the output of said current transformer,
  d. first and second switches coupled to output terminals of said full wave rectifier, said first switch provided by a zener diode which cathode is connected to an output terminal of said full wave rectifier, said second switch provided by an electromagnetically actuated reed contact,
  e. visual indicating means coupled to said first and second switches actuated when said first and second switches are closed,
  f. said first switch being closed by the breakdown of said zener diode by a voltage induced by said current transformer corresponding to an excessive current flowing through said current transformer,
  g. a second full wave rectifier coupled to said second input terminal, and
  h. the positive output of said second full wave rectifier coupled through a resistor to a network comprising another zener diode connected in series combination with a coil electromagnetically coupled to said reed contact, and a parallel combination of resistor and capacitor connected across said series combination.

3. The apparatus as described in claim 2 including another transformer, the primary of which is connected to said first input terminal, the secondary of which is coupled to said second input terminal.

4. Fault indicator apparatus for a power distribution system comprising:
  a. first and second input means adapted to be coupled to the power distribution system;
  b. first switch means coupled to said first input means and including means for preventing closure of the first switch means until the voltage at the first input means exceeds a predetermined level representing a greater than normal current flow in the power distribution system, said first switch means comprising a zener diode having a breakdown voltage which establishes said predetermined level;
  c. second switch means comprising an electromagnetically actuated reed contact;
  d. indicating means coupled in circuit with said first and second switch means for producing a signal when said first and second switch means are both closed; and
  e. means coupled between said second input means and said second switch means for closing said second switch means in response to voltage occurring at said second input means, said means for closing said second switch means including time delay circuitry for temporarily delaying the closing of said second switch means when voltage appears at said second input means and temporarily delaying the opening of said second switch means when voltage is removed from said second input means.

5. Apparatus as described in claim 4 wherein said means for closing said second switch means comprises a zener diode in series combination with a coil electromagnetically coupled to said reed contact and a capacitor and resistor connected in parallel across said series combination.

* * * * *